United States Patent [19]

Wilhelm et al.

[11] Patent Number: 5,060,382
[45] Date of Patent: Oct. 29, 1991

[54] HIGH LEVERAGE SHEARS

[75] Inventors: Gary L. Wilhelm, Statesboro; Mel C. Mock, Rocky Ford, both of Ga.

[73] Assignee: Cooper Industries, Houston, Tex.

[21] Appl. No.: 453,840

[22] Filed: Dec. 20, 1989

[51] Int. Cl.⁵ .............................................. B26B 13/12
[52] U.S. Cl. ........................................ 30/244; 30/248; 30/341
[58] Field of Search ................. 30/244, 248, 186, 235, 30/340, 341, 194, 173; 16/115

[56] References Cited

U.S. PATENT DOCUMENTS

| D. 3,950 | 4/1870 | Condon . | |
|---|---|---|---|
| D. 198,266 | 5/1964 | Hedstrom . | |
| D. 198,911 | 8/1964 | Rogers . | |
| D. 204,605 | 5/1966 | Olson . | |
| 404,667 | 6/1889 | Woodhouse et al. | 30/341 |
| 521,526 | 6/1894 | Hollingsworth . | |
| 913,225 | 2/1909 | Moline | 30/186 |
| 1,170,353 | 2/1916 | Silvear . | |
| 1,214,562 | 2/1917 | McGrath | 30/235 |
| 1,472,392 | 5/1920 | Harvey . | |
| 1,577,880 | 3/1926 | Stuart | 30/340 |
| 1,893,901 | 3/1931 | McGregor et al. . | |
| 1,924,844 | 8/1933 | Edwards . | |
| 2,715,270 | 8/1955 | Oxhandler | 30/262 |
| 2,941,294 | 6/1960 | Vosbikian et al. | 30/340 |
| 3,372,478 | 3/1968 | Wallace et al. . | |
| 3,681,845 | 8/1972 | Duprey | 30/341 |
| 3,750,282 | 8/1973 | Eaton et al. | 30/254 |
| 3,883,951 | 5/1975 | Farrell | 30/226 |
| 4,550,495 | 11/1985 | Fornes | 30/120.3 |

*Primary Examiner*—Frank T. Yost
*Assistant Examiner*—John M. Husar
*Attorney, Agent, or Firm*—Kenyon & Kenyon

[57] ABSTRACT

A cutting tool including a pair of jaws wherein each jaw has a first and second end. The jaws are pivotally coupled to each other such that the first ends engage with one another when the jaws are in a closed position. The tool further includes a pair of hollow tubular extensions each having a bend therein and first and second portions merging into one another at said bend. Each second end of one of the jaws extends into the first portion of a respective extension which includes a crimped section that fixedly secures the jaw thereto. When the jaws are in the closed position, the first portions converge toward each other and the second portions diverge from the first portions.

13 Claims, 2 Drawing Sheets

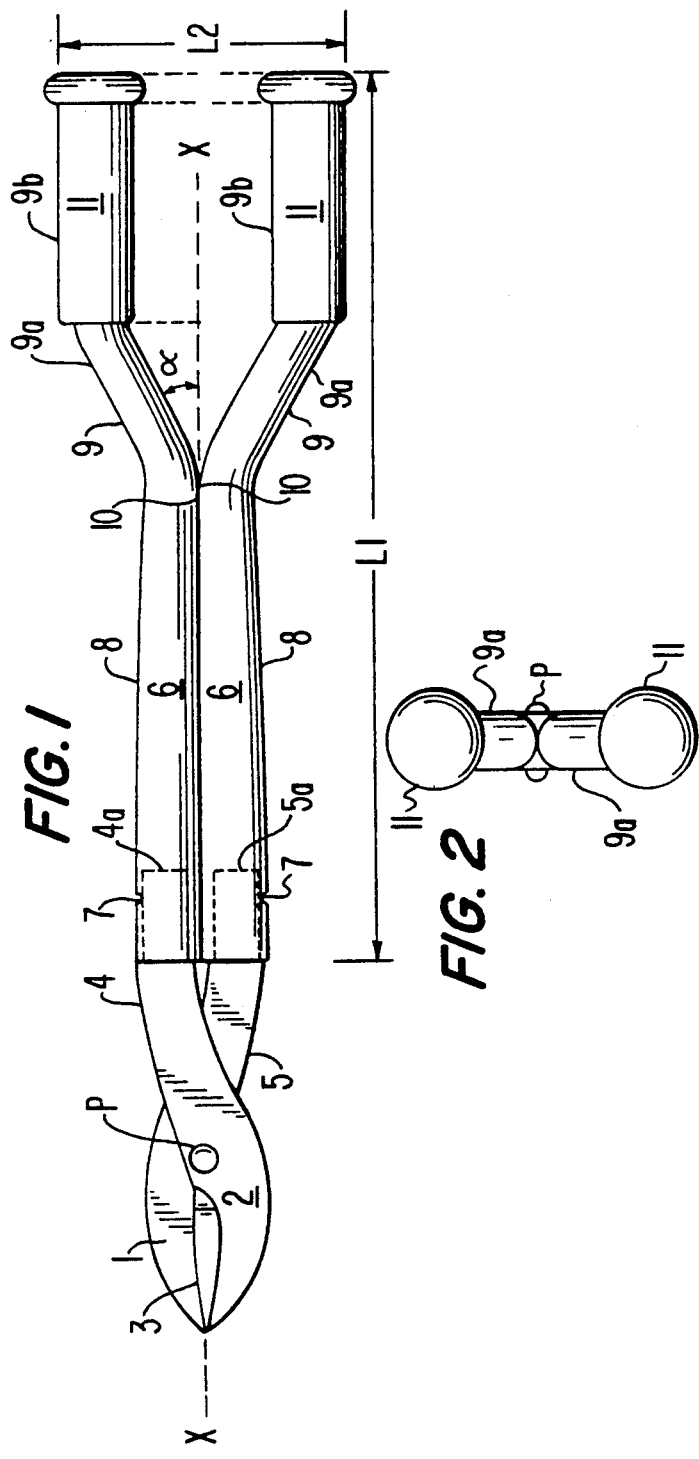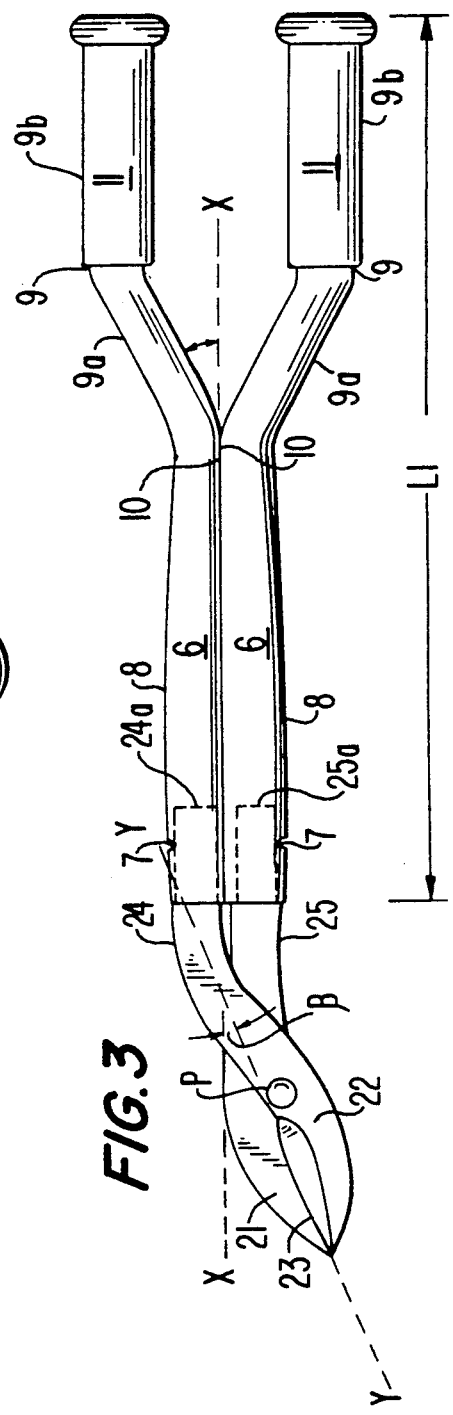

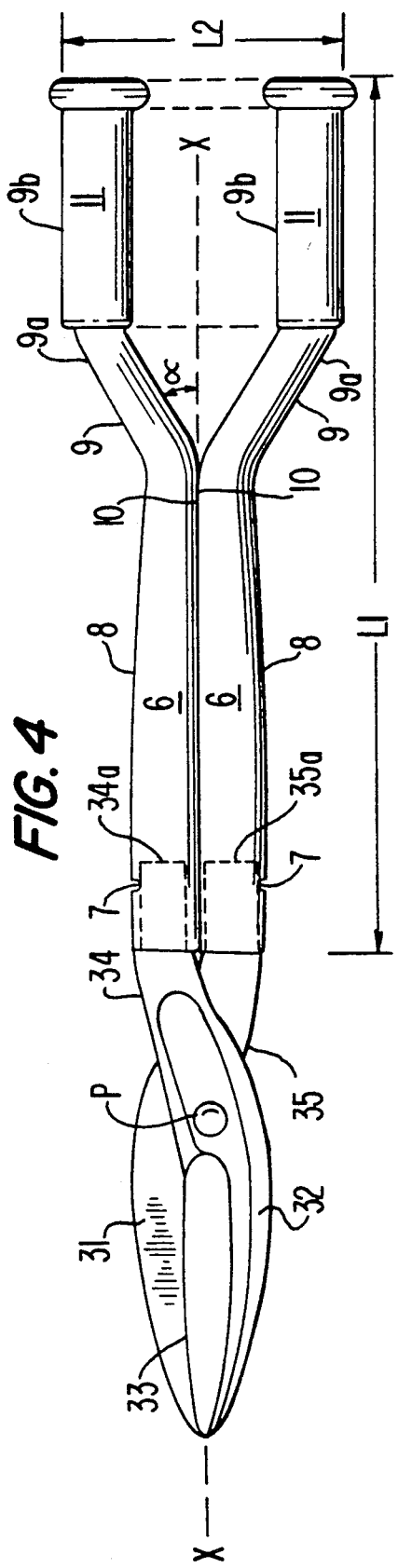
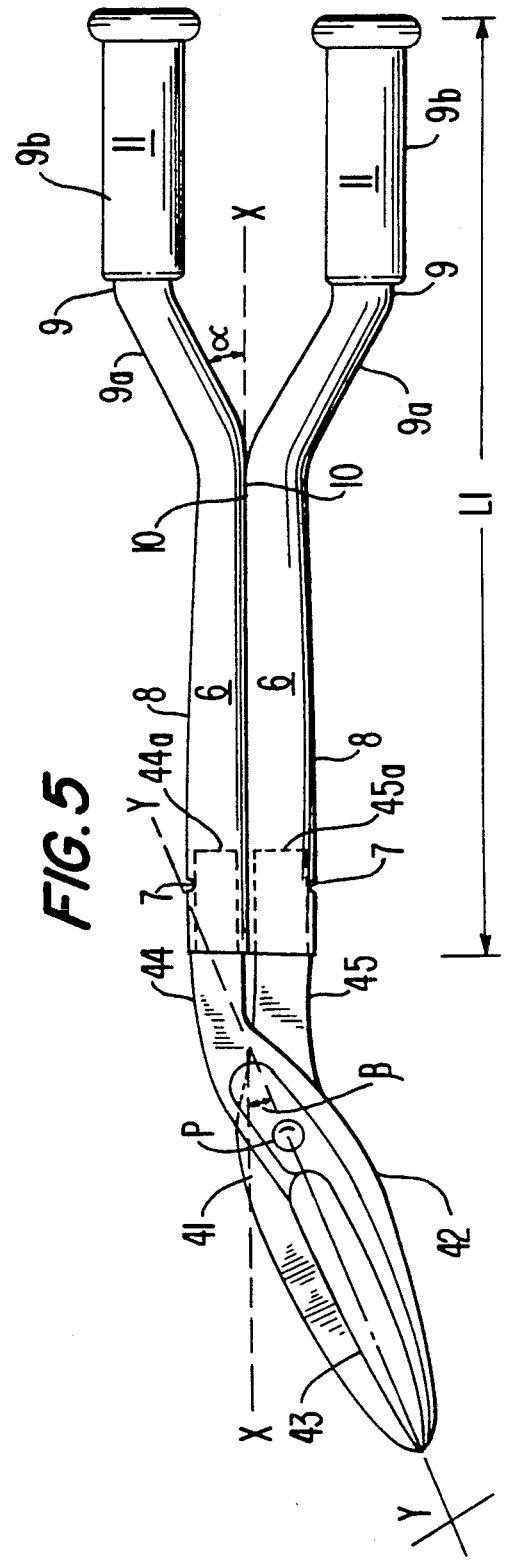

HIGH LEVERAGE SHEARS

TECHNICAL FIELD

The present invention relates to cutting tools generally, and more particularly to improvements in manual cutting tools having pivotally coupled jaws.

BACKGROUND OF THE INVENTION

Heretofore, manual cutting tools have included pivotally coupled jaws with actuating handles extending therefrom. However, among the drawbacks of such tools is the weight attributed to handles which must be made long enough to provide the appropriate leverage to cut materials such as sheet metal. These tools also do not provide a simple, readily manufactured construction which protects the user's hands from the material being cut as well as from being jammed between the handles of the tool when angularly displacing the handles to close the jaws. Thus, there is a need to provide a high leverage manual cutting tool having a lightweight, simple construction that protects the user's hands from the material being cut as well as from being jammed between the tool's handles. There is also the need to provide a single handle construction that can be used with jaws of various size and type.

SUMMARY OF THE INVENTION

The present invention is directed to a cutting tool that avoids the problems and disadvantages of the prior art. The invention accomplishes this goal through the provision of a pair of jaws each having a first and second end. A pin pivotally couples the jaws such that the first ends engage each other when the jaws are in a closed position, while each second end is fixedly secured only to one of a pair of hollow tubular extensions. Each hollow tubular extension includes a bend which forms first and second portions in the extension. The first portions extend from the jaws such that the extensions converge and contact one another along the first portions when the jaws are in the closed position. This arrangement permits a high leverage cutting tool to be both simple and lightweight in construction, while being suitable for shearing materials such as heavy gauge sheet metal. The converging feature limits the angular displacement of the extensions without the need for providing projections that extend between the extensions to limit such displacements.

Another feature of the present invention is that the second portions of the extensions diverge from the first portion, thereby spacing the handles of the second portions to protect the user's hands when closing the jaws. The diverging sections of the second portions also deflect the material being cut to further protect the user's hands therefrom. This is especially important when cutting sheet metal.

Another feature of the present invention is the relationship between extensions and the jaws in configuration and method of construction. Often in jaws of this type, the entire tool is forged. This is not only an expensive method of manufacture, but it also creates an unusually heavy and cumbersome device that detracts from its use over long periods of time. The invention provides extensions to the cutting jaws for providing the requisite leverage, while being relatively light in weight and easy to handle. Even though the handles are lightweight, they transfer considerable torque without handle deformation.

Another feature of the present invention is that jaws of various size and type can be inserted into similarly designed extensions, which are then crimped to permanently secure the jaws therein. This method of construction provides flexibility in jaw selection and a reduction in manufacturing costs in that various jaws can be used with a single extension or handle construction.

BRIEF DESCRIPTION OF THE DRAWINGS

FIG. 1 is a side elevational view of a cutting tool in accordance with the principles of the invention;

FIG. 2 is an end view of the cutting tool of FIG. 1;

FIG. 3 is a side elevational view of a further embodiment of the cutting tool of FIG. 1;

FIG. 4 is a side elevational view of another cutting tool in accordance with the principles of the invention; and FIG. 5 is a side elevational view of a further embodiment of the cutting tool of FIG. 4.

DETAILED DESCRIPTION

Referring to the drawings in detail wherein like numerals indicate like elements, FIG. 1 shows the high leverage shears in accordance with the principles of the invention, wherein jaws 1, 2 are pivotally coupled at pin P and include actuating portions 4, 5 which are operated by handle portions 9b of hollow tubular extensions 6.

Each tubular extension 6 includes a bend at the juncture of portions 8, 9 of extension 6. Actuating portions 4, 5 of jaws 1, 2 include reduced sections $4_a$, $5_a$ which are inserted into extensions 6. Extensions 6 are crimped, for example, in the region designated by reference numeral 7, to fixedly secure the actuating portions therein. Although each crimped section is shown as extending partially along the periphery of an extension, each extension can be crimped completely about its entire circumferential periphery. Furthermore, each reduced section $4_a$, $5_a$ can include a notch to receive the projection(s) formed in extension 6 when extension 6 is crimped. Portions 9 include intermediate sections 9a and handle sections 9b. Gripping members 11 surround handle sections 9b and preferably comprise an elastomeric polymer such as rubber or plastic. Each gripping member 11 also can be a single-piece mold.

As evident from FIG. 1, extensions 6 converge and contact one another along contact surfaces 10 when jaws 1, 2 are in the closed position. Thus, contact surfaces 10 limit extension 6 from pivoting further. Then, extensions 6, which include a further bend between sections 9a and 9b, diverge along intermediate sections 9a so that handle sections 9b, which extend substantially parallel to one another, are spaced. As a result, handle sections 9b remain spaced when jaws 1, 2 are closed, thereby protecting the user's hands from being jammed therebetween. Furthermore, the divergent configuration of sections 9a forms a shield along the outwardly facing surfaces of sections 9a that deflects the cut material away from the user's hands. This is especially important when the material being cut is sheet metal, which could otherwise cut the user's hands. The angle of divergence must be great enough to provide adequate deflection, while being small enough to avoid the cut material from binding in the region of sections 9a. To provide a shield that deflects the cut material without causing unreasonable binding of the same, diverging sections 9a diverge from symmetrical axis x-x of extension pair 6, 6 by angle α which is about 30 to 50 degrees.

Referring to FIG. 1, jaw 2 is beveled to form cutting edge 3. Cutting edge 3 extends substantially parallel to symmetrical axis x—x of extension pair 6, 6. Although not shown, jaw 1 also can include such a cutting edge. In contrast, jaws 21, 22 are oriented so that the cutting tool illustrated in FIG. 3 can be used to cut material, such as sheet metal, without lifting the material from the floor. To this end, jaw 22 includes a bevel which forms cutting edge 23 that extends along line y—y that forms an angle β of at least 20 degrees with symmetrical axis x—x of extension pair 6, 6. Due this orientation, handles 9b may be angularly displaced without the floor, located beneath the material being cut, interfering therewith.

FIG. 4 shows a further embodiment of the cutting tool. Wherein jaws 31, 32 are pivotally coupled at point P and include cutting edge 33, actuating portions 34, 35 and reduced sections 34a, 35a. The cutting tool of FIG. 5 includes jaws 41, 42 pivotally coupled at P, cutting edge 43, actuating portions 44, 45 and reduced sections 44a, 45a. As in the embodiment of FIG. 3, jaws 41, 42 are oriented so that the cutting tool illustrated in FIG. 4 can be used to cut material without lifting the material from the floor.

Obviously, the sizes and materials used in the components making up the shears may be selected from a wide variety of sizes and/or materials. Merely to exemplify a preferred embodiment, the following example may be recited. The jaws are made from forged metal and the extensions are made from 1 inch O.D. steel tubing. Extensions 6 extend laterally a distance L1 which is about 16 inches. L2 represents the distance between the outermost points on handles 11 which is about 5 inches. The relationship between the extensions and the jaws insure that the jaws can be operated without damage to the tubular extensions. If the extensions are substantially longer, there is risk that the hollow portion will bend or break. Similarly, if the jaws are substantially longer, enough leverage cannot be applied to operate them properly. Accordingly, to maximize the leverage with the weight advantages, the ratio between the distance from pivot pin P to the end of the extensions and the distance from pivot pin P to the tip of the jaws is about 3-9:1.

The cutting tool can be manufactured by selecting the jaws and appropriately sized metal tubular extensions therefor to provide the requisite cutting strength and leverage for the intended application. The tube is bent in accordance with the drawings. Then, the reduced or tapered sections of the jaws, e.g., tapered sections 4a, 5a, are press-fit into the extensions. In the case where a reduced section has sharp corners or edges, the corners or edges are rounded so that the section may be readily inserted into its extension. Finally, the extensions are crimped about these sections to fixedly secure the extensions thereto. When notches are provided in the reduced sections the crimp also causes portions of the extensions to project into those notches. This further secures the jaws to the tubular extensions. Accordingly, a single extension or handle construction can be used with jaws of different size and type as exemplified in the drawings.

Having described the invention in detail, it will be recognized that the foregoing is considered as illustrative only of the principles of the invention. The full scope of the invention is set out in the claims that follow and their equivalents. Accordingly, the claims and specification should not be construed to unduly narrow the full scope of protection to which the invention is entitled.

We calim:

1. A cutting tool comprising:
    a pair of jaws, each jaw having a first end and a second end;
    a pin that pivotally couples said jaws such that said first ends engage with one another when said jaws are in closed positoin; and
    a pair of extensions, each extension consisting of a single hollow tubular member having first and second portins and a bend therebetween, said bend defining an angle with respect to the first portion of the hollow tubular member of about 30 to 50 degrees, said second ends of the jaws being fixedly secured only to said extensions, wherein said extensions extend from the jaws and converge and contact one another along said first portions when the jaws are in said closed position.

2. The cutting tool of claim 1 wherein said second portions diverge when the jaws are in said closed position.

3. The cutting tool of claim 2 wherein each second portion includes a handle section spaced from said first portion, wherein said handle sections are substantially parallel when the jaws are in said closed position.

4. The cuting tool of claim 3 wherein a grip is provied about each handle section.

5. The cutting tool of claim 4 wherein said grips comprise an elastomeric polymer.

6. The cutting tool of claim 4 wherein said grips comprise rubber.

7. The cutting tool of claim 1 wherein each second end of a jaw extends into the first portion of a respective extension and said first portion includes a cripmed sectionin the vicinity of the second end of said jaw.

8. The cutting tool of claim 7 wherein each crimped section extends along the circumferential periphery of said first portion in the vicinity of the second end of a respective jaw.

9. The cutting tool of claim 8 wherein said jaws include a nothc, and said crimped sections comprise a projection which extends into a respective notch.

10. The cutting tool of claim 1 wherein the ratio betwen the lateral distance from said pin to the end of said second portions and the pin to the end of the jaws which is spaced from said extensions is at least 3:1.

11. The cutting tool of claim 1 wherein said extension pair has an axis of symmetry and at least one jaw includes a cutting edge adjacent to its first end, wherein said cutting edge extends along a line which is substantially skewed with respect to said symmetrical axis.

12. A tool for cutting sheet metal comrpising:
    a pair of jaws, each jaw having a first and second end and being pivotally coupled to each other such that said first ends engage with one another when the said jaws are in a closed position; and
    a pair of hollow tubular extensions, each extension having a bend therein and first and second portions merging into one another at said bend, each of said first portions has an axis of symmetry and said second portions diverge therefrom by an angle of about 30 to 50 degrees, each second end of one of said jaws extends into the first portion of a respective extension which includes a crimped section that fixedly secures the jaw thereto, wherein, when the jaws are in said closed position, said extensions converge toward each other and contact one another along said first portions, while said second portions diverge therefrom.

13. A cutting tool comprising:
a pair of jaws, each jaw comprising forged metal and having a first and second end, at least one jaw including a bevel which forms a cutting edge adjacent to its first end;
a pin that pivotally couples said jaws such that said cutting edge of said one jaw engages with the other jaws when jaws are in a closed position;
a pair of extensions, each exension consisting of a single hollow tubular member having a first section, an intermediate section and a handle section, each extension further including a bend between said first and intermediate sections defining an angle of about 30-50 degrees therbetween, and each extension further including a bend between said intermediate and handle sections, each second end of one of said jaws extending into the first section of a respective extension which includes a crimped portion that fixedly secures the jaw thereto, wherein, when the jaws are in said closed position, said extensions converge toward each other and contact one another along siad first sections at a point near that end of the extension which is distal from the second end of the jaws, said intermediate sections diverge and said handle sections extend substantially parallel to one another, and wherein the ratio of the lateral distance from said pin to the end of the jaws and the pin to the end of the handles opposite the jaws is at least 3:1.

* * * * *